Jan. 2, 1951     W. B. HEANEY     2,536,129
BEARING WASHING AND DRYING MACHINE
Filed March 26, 1947
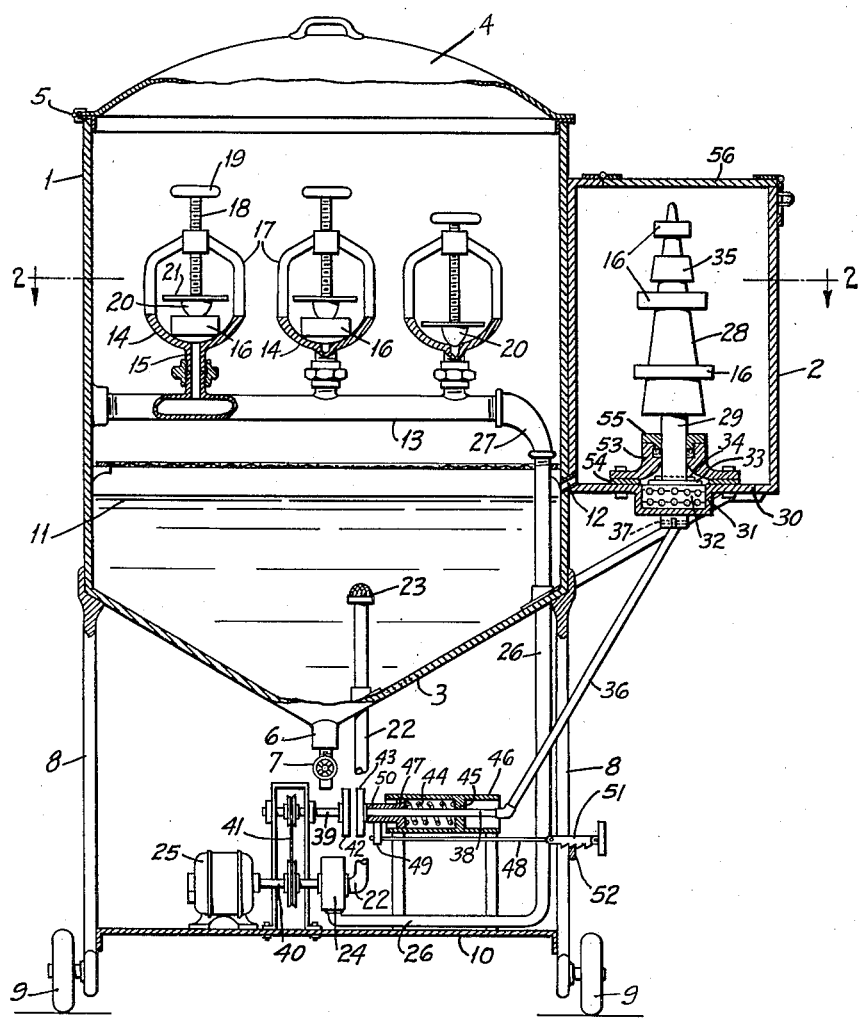
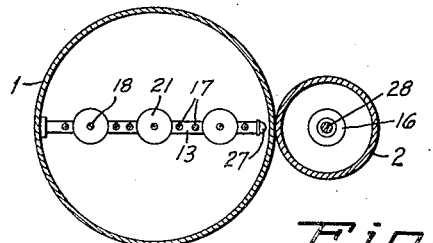
INVENTOR.
William B. Heaney
BY A. Schapp
ATTORNEY Patented Jan. 2, 1951

2,536,129

UNITED STATES PATENT OFFICE 2,536,129

BEARING WASHING AND DRYING MACHINE

William B. Heaney, Manteca, Calif.

Application March 26, 1947, Serial No. 737,257

2 Claims. (Cl. 134—60)

The present invention relates to a bearing washing and drying machine, and its principal object is to provide a machine of the character described in which bearings of various sizes may be conveniently washed and dried in quick succession and with a minimum effort.

The washing part of the present machine is a further development of the washing machine disclosed in my co-pending application, Serial No. 606,609, which has matured into Patent No. 2,519,654, granted August 22, 1950, while the drying part has been added for convenient joint use with the latter.

It is further proposed to employ a pump for the washing machine and a rotary body for the drying machine and to provide power connections and an arrangement of parts whereby both the pump and the rotary body may be driven by the same source of power.

It is a further object of the invention to use a liquid cleaning agent for washing the bearings and to use centrifugal force for removing the cleaning agent and to provide an arrangement whereby the cleaning liquid from the drier is automatically returned to the washer.

Further objects and advantages of my invention will appear as the specification proceeds, and the novel features of my invention will be fully defined in the claims attached hereto.

The preferred form of my invention is illustrated in the accompanying drawing, in which Figure 1 shows a vertical section through my bearing washing and drying machine, and Figure 2, a horizontal section taken along line 2—2 of Figure 1, on a reduced scale.

While I have shown only the preferred form of my invention, I wish to have it understood that various changes and modifications may be made within the scope of the claims attached hereto without departing from the spirit of the invention.

Referring to the drawing in detail, my machine comprises in its principal features a main tank 1 having bearing washing means incorporated therein, an auxiliary tank 2 having a centrifugal dried mounted therein, and a common power plant for the washing means and the drier mounted underneath the main tank.

The main tank 1 may be of any suitable form and is here shown as being cylindrical in its main body section, with a tapered bottom 3 and a cover 4 which may be hinged to the body section as at 5. The bottom has a central drain outlet 6 controlled by a valve 7.

The tank 1 is supported, in elevated position, on a suitable frame structure 8 carried on wheels 9. A horizontal platform 10 is mounted in the frame structure below the bottom of the tank to serve as a support for the power plant as shown.

In operation the tank is filled with a cleansing liquid, substantially to the level indicated at 11.

The auxiliary tank 2 is mounted upon the side of the main tank, is preferably of much smaller proportions and is positioned in such a manner that its bottom is slightly above the liquid level of the main tank, so that any liquid collecting in the auxiliary tank will automatically flow back to the main tank by gravity, through a connecting passage 12.

The main tank has the bearing washing means disposed therein, which comprises a horizontal pipe 13 positioned diametrically across the tank and a series of cups 14 mounted on the pipe so as to communicate therewith through central passages 15. The cups are dimensioned to receive bearings 16 therein, the bearings being positioned horizontally above the cup bottoms.

Each cup has a superstructure 17 adapted to threadedly receive a screw 18 adapted for operation by a handle 19. The bottom of each screw carries a tapered head 20 adapted for engagement in the hole of the bearing for urging the bearing upon the bottom of the cup and for firmly holding the bearing in the cup, as shown particularly well in connection with the left-hand cup in Figure 1. The screw head may also be used for closing the passage 15 in case no bearing is used in any particular cup, as shown in connection with the right-hand cup in Figure 1.

Each screw is also provided with a deflecting plate 21 above the screw head to deflect liquid forced through the bearing from below.

Cleaning liquid is forced through pipe 13 and through the bearings in the cups by means of a pumping system including an intake pipe 22 having a screened mouth 23 in the liquid body, a pump 24 driven by a motor 25 and a discharge pipe 26 connecting with pipe 13, as at 27.

The drier comprises an elongated cone 28 mounted on a vertical shaft 29, which latter extends through the bottom 30 of the auxiliary tank 2. The bottom is formed with a depression 31 adapted to accommodate a thrust bearing 32, the upper race of which is fixed on the shaft. A safety ring 33 is superimposed on the bearing and is held by means of a pin 34 extending through the shaft so as to hold the shaft against dropping in case the bearing race should work loose.

The cone is adapted to have bearings of various sizes mounted thereon for removal of any cleaning liquid by centrifugal force when the cone is rotated at high speed. If a number of bearings of the same size are to be dried at the same time, suitable adapters 35 may be used, one of which is shown in the drawing.

The cone is driven by a flexible shaft 36 joined to shaft 29 as at 37, and to a horizontal shaft 38 mounted underneath the main tank 1 and in alinement with a shaft 39 running parallel to the motor shaft 40 and connected thereto by a belt drive 41.

The shafts 38 and 39 have opposing clutch members 42—43, which are adapted to be forced into driving engagement by a spring 44 bearing at one end on an abutment 45 in a cylinder 46 and at the other end on a disc 47 fixed to the shaft 38 in spaced relation to the clutch member 43.

The latter clutch member may be withdrawn for disengagement by any suitable means as by a rod 48 having one end secured to an arm 49 projecting from a sleeve 50 revolvable on shaft 38 between the clutch member 43 and the disc 47. The other end of the rod has a toothed locking member 51 adapted for engagement over a fixed retaining member 52 for holding the rod in retracted position.

The bearing 32 is protected against the liquid by means of a shield 53 having a neck portion surrounding the shaft 29 and an annular flange bearing on the tank bottom outside the depression 31 through an interposed gasket 54, the flange being bolted to the bottom as shown. The neck carries suitable packing around the shaft held in place by a packing gland 55. The tank 2 is provided with hinged cover 56.

In operation, the attendant places the bearings to be washed in the cups 14 and securely fastens them in place by operation of the screws 18.

After the motor has been started, the pump 24 pumps the cleaning liquid from the main body through pipes 22 and 26 into the cups and through the bearings, until the latter are thoroughly washed. The liquid emitted from the bearings splashes against the deflecting plates 21 and returns to the main body. If any one of the cups is not used in this process, the operator closes the passage 15 leading to that cup by advancing the tapered screw head as far as it will go.

After the washing operation is finished, the operator opens the cover of the main tank and the cover 56 of the auxiliary tank and then places the bearings on the cone 28. Upon release of the clutch member 51 the cone will rotate at high speed and remove the liquid adhering to the bearings by centrifugal force. The removed liquid automatically returns through passage 12 to the main body in tank 1.

I claim:

1. In a washing and drying machine of the character described, a tank adapted for holding a cleaning liquid and having means for mounting an object to be cleaned above the liquid and means for pumping the liquid through said object, a second tank secured upon the side of the first tank and having a bottom disposed slightly above the normal liquid level of the first tank and having a central depression in said bottom, a bearing in said depression, a vertical shaft carried by said bearing and having centrifugal means within the second tank for removing the liquid from the object when the latter is positioned with respect thereto, the two tanks having an interconnecting port immediately above the bottom of the second tank and adapted to guide discharged liquid back to the first tank, and the second tank having a shield surrounding the lower end of the shaft and sealed against the bottom of said tank to prevent the discharged liquid from entering the bearing.

2. In a washing and drying machine of the character described, a tank adapted for holding a cleaning liquid and having means for mounting an object to be cleaned above the liquid and means for pumping the liquid through said object, a second tank secured upon the side of the first tank and having a bottom disposed slightly above the normal liquid level of the first tank, a bearing supported by the bottom, a vertical shaft carried by said bearing and having centrifugal means within the second tank for removing the liquid from the object when the latter is positioned with respect thereto, the two tanks having an interconnecting port immediately above the bottom of the second tank and adapted to guide discharged liquid back to the first tank, and the second tank having a shield surrounding the lower end of the shaft and sealed against the bottom of said tank to prevent the discharged liquid from entering the bearing.

WILLIAM B. HEANEY.

REFERENCES CITED

The following references are of record in the file of this patent:

UNITED STATES PATENTS

| Number | Name | Date |
|---|---|---|
| 70,973 | Davison | Nov. 19, 1867 |
| 348,316 | Cabble | Aug. 3, 1886 |
| 353,390 | Weston | Mar. 30, 1886 |
| 1,262,962 | Lewis | Apr. 16, 1918 |
| 1,588,588 | Kleyn | June 15, 1926 |
| 1,614,069 | Keser | Jan. 11, 1927 |
| 2,219,028 | Wolff | Oct. 22, 1940 |
| 2,263,367 | Peterson | Nov. 18, 1941 |